United States Patent
Huovinen et al.

(10) Patent No.: US 6,576,710 B1
(45) Date of Patent: Jun. 10, 2003

(54) MULTI-STAGE PROCESS FOR THE PREPARATION OF α-OLEFIN POLYMERS HAVING CONTROLLED STEREOREGULARITY AND PRODUCTS PREPARED THEREOF

(75) Inventors: Päivi Huovinen, Ferrara (IT); Pauli Leskinen, Helsinki (FI); Thomas Garoff, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/890,796
(22) PCT Filed: Feb. 11, 2000
(86) PCT No.: PCT/FI00/00097
§ 371 (c)(1), (2), (4) Date: Sep. 26, 2001
(87) PCT Pub. No.: WO00/47637
PCT Pub. Date: Aug. 17, 2000

(30) Foreign Application Priority Data

Feb. 12, 1999 (FI) .................................................. 990282

(51) Int. Cl.$^7$ .......................... C08L 23/00; C08L 23/04; C08F 10/00
(52) U.S. Cl. ....................................... 525/191; 525/240
(58) Field of Search ................................. 525/191, 240

(56) References Cited

U.S. PATENT DOCUMENTS 4,016,342 A    4/1977    Wagensommer
4,740,550 A    4/1988    Foster

FOREIGN PATENT DOCUMENTS

| EP | 0 564 004 A1 | 10/1993 |
| EP | 0 573 862 A2 | 12/1993 |
| EP | 0 613 912 A3 | 9/1994 |
| EP | A887379 | 12/1998 |

Primary Examiner—Nathan M. Nutter
(74) Attorney, Agent, or Firm—Birch Stewart Kolasch & Birch LLP

(57) ABSTRACT

The invention relates to the preparation of an α-olefin polymer product having controlled stereoregularity, comprising the successive step of: (i) producing a first polymerization product by contacting under polymerization conditions an α-olefin monomer with a polymerization catalyst system comprising a transition metal compound, a first organometal compound and a stereoregulating external electron donor to give a first polymerization reaction mixture; (ii) producing a second polymerization product by contacting additional α-olefin monomer with the first polymerization reaction mixture. The controlled stereoregularity is achieved in such a way that in step (ii) the second polymerization product is produced in the presence of a stereoregularity controlling agent. The stereoregularity controlling agent e.g. a second organometal compound which contains, on an atom basis, more halogen per metal than the first organometal compound, or 0.01–1.2 % of an olefin which is not said α-olefin monomer, calculated on the total molar amount of olefin and α-olefin monomer.

37 Claims, No Drawings

MULTI-STAGE PROCESS FOR THE PREPARATION OF α-OLEFIN POLYMERS HAVING CONTROLLED STEREOREGULARITY AND PRODUCTS PREPARED THEREOF

This application is the national phase under 35 U.S.C. §371 of PCT International Application No. PCT/FI00/00094 which has an International filing date of Feb. 11, 2000, which designated the United States of America and was published in English.

The invention relates to a process for the preparation of α-olefin polymers, especially polypropene, having a controlled stereoregularity, comprising the successive steps of: (i) producing a first polymerization product by contacting under polymerization conditions an α-olefin monomer with a polymerization catalyst system comprising a transition metal compound, a first organometal compound and a stereoregulating external electron donor, to give a first polymerization reaction mixture; (ii) producing a second polymerization product by contacting an α-olefin monomer with at least the first polymerization reaction mixture.

The word "comprising" means that the subsequently listed subject matter must be included, but that further subject matter may also be included. It is open. See Grubb, P. W., Patents in Chemistry and Biotechnology, Clarendon Press, Oxford, 1986, p. 220.

The first and second polymerization products may have the same or different melt flow rate (MFR) values. The MFR values disclosed here are measured according to the standard ISO 1133 at 230° C. using a 2.16 kg load.

By α-olefin monomer is in this connection meant an α-olefin which is capable of polymerization by the insertion (Ziegler-Natta) mechanism. An α-olefin is a compound having the structure $CH_2$=CHR, wherein R is a linear or cyclic alkyl group. Typical α-olefin monomers of the invention are propene (R=—$CH_3$), butene-1 (R=—$CH_2CH_3$), 4-methylpentene-1 (R=$CH_2CH(CH_3)_2$), hexene-1 (R=—$(CH_2)_3CH_3$) and octene-1 (R=—$(CH_2)_5CH_3$). By an α-olefin polymer is meant an α-olefin homopolymer or copolymer. As monomers to be copolymerized can, in addition to α-olefin monomers of the above mentioned type, also be used ethene. By transition metal compound is in this connection meant a transition metal compound which is capable of contributing to the polymerization ability of said polymerization catalyst system. The transition metal compound is the basis of the Ziegler-Natta system's so called "catalyst" or "procatalyst". By first organometal compound is in this connection meant an organometal compound which is capable of contributing to the polymerization ability of said polymerization catalyst system. The organometal compound is also called the "cocatalyst" of the Ziegler-Natta system.

The presence of a stereoregulating electron donor in an α-olefin polymerization catalyst produces a stereospecific polymer. Such a polymer usually has high isotacticity, i.e. a high portion of α-olefin mers in the macromolecular chain having the same configuration with respect to a common direction along the chain. With propene polymers, the isotactic index I.I., measured as the percentage of a polypropene sample which is insoluble in boiling n-hexane, or the xylene soluble fraction XS thereof, is a measure of the isotacticity of the polymer. Isotactic macromolecules are associated and crystallized whereby their solubility is lower. Thus, the lower the XS of an α-olefin polymer, the higher is its isotacticity. The isotacticity may also be measured by Fourier Transform Infrared Spectroscopy (FTIR).

The preparation of highly stereoregular polymers of $C_3$–$C_{10}$-α-olefins, such as propene, in many phases or steps, is known e.g. from JP Patent Application 91048, EP Patent Specification 339 804 and FI Patent Application 961722.

According to the examples of the last mentioned document, propylene is in a first step polymerized in the presence of an $MgCl_2/TiCl_4/Et_3Al/D$ (D=stereoregulating external electron donor, Et=ethyl) type catalyst system and no or little hydrogen as molar mass limiting termination agent into a stereoregular propylene polymer having a low MFR, and in a second step polymerized in the presence of the same catalyst system and a large amount of hydrogen termination agent into a stereoregular propylene polymer having a high MFR. The result is a stereoregular propene polymer product having a broad molar mass distribution in the form of a low MFR (high molar mass) fraction and a high MFR (low molar mass) fraction.

It is assumed that the overall high stereoregularity and the presence of a polymer fraction of low MFR gives good strength and rigidity as well as low creep to the polymer product. The presence of a polymer fraction of high MFR, on the other hand, gives good melt processability and flexibility to the polymer product.

In multi-phase or -stage processes of the above mentioned type for the preparation of α-olefin polymers, the isotacticities tend to vary between the phases or stages of the process, due to different conditions and donor concentrations, and control of the isotacticity is sometimes difficult. For example, if the average XS of the product in the preceding step is 3–3.5%, in the subsequent step it might have decreased to only 2–2.5%. In practice, this means that the polymer fraction produced in the subsequent step or steps has an XS of below 1.5%. In some applications such as in film and fibre products the isotacticity of the propene polymer needs to be controlled to give an XS value of about 3.5–4%. In order to reach such XS values for the final product in an uncontrolled propene polymerization process, the XS in the first reactor should be more than 5%, because the second reactor is producing an XS of only 2–3%. However, this kind of isotacticity and crystallinity difference between the materials of the first and second steps results in homogeneity problems which can be detrimental for the film and fibre products.

The above mentioned problems and findings relating to the multi-stage production of α-olefin polymer products have now been dealt with principally in the following way.

As was previously mentioned, the present invention relates to a process for the polymerization of an α-olefin polymer having controlled stereoregularity. In the process, a first and a second polymerization product are produced by contacting an α-olefin with a high activity polymerization catalyst system comprising a first organometal compound in two steps (i) and (ii).

Now, it has been realized that the above mentioned problem can be solved, if in the process, the second polymerization product is produced in the presence of a stereoregularity controlling agent in step (ii). The stereoregularity controlling agent is selected from a second organometal compound which contains, on an atom basis, more halogen per metal than the first organometal compound, or 0.01–1.2% of an olefin which is not said used α-olefin monomer(s), calculated on the total molar amount of the olefin and the α-olefin monomer(s).

It has also been found that in view of the quality of some end products, more important than the level of XS of the polymer obtained from the reactor system is that the XS values are essentially on the same level in every phase or stage of the process. Especially very good quality fibres and films, but also different molding applications are achieved with polymers, which are produced in multi-phase or -stage process where isotacticities, i.e. XS values, are controlled to essentially the same level in every phase or stage.

According to a preferred embodiment of the present invention, controlling the stereoregularity means especially controlling the stereoregularity to essentially the same level in every phase or stage of the process, i.e. the isotacticities or XS values are balanced in every phase or stage of the process.

The improvements obtained by using a more halogenated organometal compound and/or small amounts of olefins when producing the second polymer fraction are verified by the examples.

The polymer products prepared according to the process of the invention may be unimodal polymers or bimodal polymers with narrow or more or less broad molecular mass distribution. MFR values can vary in wide ranges from 0.03 to 2000 g/10 min. Unimodal polymers, i.e. polymers having the same MFR values in every phase are especially suitable e.g. for fibre applications.

The α-olefin monomer has been defined above. Preferably, it is a $C_3$–$C_8$-α-olefin. The most preferred α-olefin monomer is propene. In either or both of steps (i) and (ii), one or more comonomers may be used. They may be α-olefin monomers as defined above. However, ethene is the most advantageous comonomer, when a comonomer is used. In step (ii) the amount of comonomer is preferably less than 10%, based on the total amount of monomers.

According to an embodiment of the invention, the first organometallic compound is a conventional so called cocatalyst, preferably a first organoaluminium compound. More preferably, the first organoaluminium compound has the formula (1)

$$R_{3m-n}Al_mX_n \quad (1)$$

wherein R is a $C_1$–$C_{12}$ alkyl, X is a halogen, m is 1 or 2 and n is an integer such that $0 \leq n < 3m-1$. Advantageously, the first organoaluminium compound having the formula (1) is a tri-$C_1$–$C_{12}$ alkyl aluminium, most preferably triethyl aluminium TEA.

According to an embodiment of the invention, the second organometal compound is a second organoaluminium compound. Typically, it is selected among more halogenated so called olefin polymerization cocatalysts. See above. Preferably, the second organoaluminium compound has the formula (2)

$$R'_{3m'-n'}Al_{m'}X'_{n'} \quad (2)$$

wherein R' is a $C_1$–$C_{12}$ alkyl, X' is a halogen, m' is 1 or 2 and n' is such an integer that n'/m'>n/m, wherein n and m are the same as in formula (1), and n'<3m'. Advantageously, the second organoaluminium compound which has the formula (2) is selected from $C_1$–$C_4$ alkylaluminium dihalides such as ethylaluminium dichloride (EASC), di-$C_1$–$C_4$ alkylaluminium halides such as diethylaluminium chloride (DEAC) and $C_1$–$C_4$ alkylaluminium sesquihalides such as ethylaluminium sesquichloride (EADC), as well as mixtures thereof. The most preferable second organoaluminium compound which has the formula (2) is EADC. DEAC is also preferable, because it contains much less chlorine than e.g. EADC (about half of the chlorine amount of EADC), and can therefore be used in very wide range of low chlorine applications such as food packages.

It should be born in mind that the above mentioned first and second organometal compounds are not selected independently, but always so that the second organometal compound has more halogen per metal than the first one. Typical first organometal compound/second organometal compound pairs of the invention are trialkyl aluminium/dialkyl aluminium halide, trialkyl aluminium/alkyl aluminium sesquihalide, trialkyl aluminium/alkyl aluminium dihalide, dialkyl aluminium halide/alkyl aluminium sesquihalide, dialkyl aluminium halide/alkyl aluminium dihalide, alkyl aluminium sesquihalide/alkyl aluminium dihalide. Preferable first organometal compound/second organometal compound pairs of the invention are triethyl aluminium/diethyl aluminium chloride, triethyl aluminium/ethyl aluminium sesquichloride, triethyl aluminium/ethyl aluminium dichloride, diethyl aluminium chloride/ethyl aluminium sesquichloride, diethyl aluminium chloride/ethyl aluminium dichloride and ethyl aluminium sesquichloride/ethyl aluminium dichloride. The most preferable first organometal compound/second organometal compound pair is triethyl aluminium/ethyl aluminium dichloride.

As was said above, the isotacticity can be controlled by using a halogen containing organometal compound when preparing the second polymerization product. According to another embodiment of the invention, the isotacticity can be controlled by using a small amount of an olefin other than the α-olefin monomer(s), such as ethene when preparing the second polymerization product. The olefin used in small amounts in step (ii) is selected among olefins (ethene and α-olefins) which are not the same as the α-olefin monomer used in the present invention. The most preferable olefin used in step (ii) in small amounts is ethene. The olefin can be used with or without the halogen containing organometal compound. The amount of olefin is 0.001–1.2%, based on the total molar amount of the olefin and the α-olefin monomer(s). Preferably, it is 0.08–0.8%, most preferably 0.1–0.4%.

The organometal compounds are selected and the small amount of olefin are used according to their assumed ability to interact with the stereoregulating external electron donor (s) of the catalyst system(s). Therefore, the selection of a suitable stereoregulating external electron donor is also a very important part of the invention. Usually, the organometal compounds of the invention are selected among the conventional less and more halogenated cocatalysts used in the art. Consequently, the stereoregulating external electron donor(s) is(are) also usually selected among the corresponding conventional electron donors of the art.

The stereoregulating external donor(s) is(are) preferably selected from hydrocarboxy silane compounds and hydrocarboxy alkane compounds. More preferably, the stereoregulating external donor is selected from hydrocarbyloxy silane compounds which have the formula (3)

$$R''_{n''}Si(OR''')_{4-n''} \quad (3)$$

wherein R" and R'" are, independently, a $C_1$–$C_{12}$-hydrocarbyl, and n" is an integer 1–3.

More specific examples of useful hydrocarboxy silane compounds are tricyclopentylmethoxy silane, tricyclopentylethoxy silane, triphenylmethoxy silane, triphenylethoxy silane, diphenyldimethoxy silane, diphenyldiethoxy silane, dicyclopentyldimethoxy silane, dicyclopentyldiethoxy silane, methylphenyldimethoxy silane, methylphenyldiethoxy silane, ethylphenyldimethoxy silane, ethylphenyldiethoxy silane, cyclopentyltrimethoxy silane, phenyltrimethoxy silane, cyclopentyltriethoxy silane and phenyltriethoxy silane.

Still more preferably, the hydrocarbyloxy silane compound having the formula (3) is a di-(α or β)-branched $C_4$–$C_{12}$-hydrocarbyl-di-$C_1$–$C_3$-alkoxy silane or a mono-($\alpha$ or $\beta$)-branched $C_4$–$C_{12}$-hydrocarbyl-$C_1$–$C_3$-trialkoxy silane, and most preferably it is dicyclopentyl dimethoxy silane or cyclohexyl methyl dimethoxy silane.

Assumingly, the second organometal compound interfers with the donor equilibrium by coordinating more strongly with the stereoregulating electron donor. See above. As a consequence, atactic polymerization is facilitated. Although even small amounts of the second organometal compound will shift the equilibrium in the direction of producing more high XS material, it is important to establish the amount of used second organometal compound with respect to the amount of used donor. When using an organoaluninium compound as the second organometal compound, the amounts thereof expressed as aluminium $Al_2$ and of the stereoregulating external electron donor D preferably are such that the molar feed ratio $Al_2/D$ is from about 0.1 to about 30, more preferably from about 0.5 to about 10.

When aiming at a controlled higher amount of high XS polymer fraction, the amount of the second organometal compound must be functional, but not so high as to remove essentially all of the stereoregulating electron donor, because then, isotactic polymer is not produced in the first place. In that case, when using an organoaluminium compound as the second organometal compound, the optimal feed ratio $Al_2/D$ is from about 0.5 to about 1.5, preferably from about 0.6 to about 1.4. If the polymerization is carried out in a loop-loop reactor system, then, in order to balance the XS values in different reactors, more donor has to be added to the second loop reactor.

The amounts of the other reagents and/or components are defined more closely below in connection with the transition metal compound used in the claimed process.

As was stated above, the invention relates to a process for the preparation of an $\alpha$-olefin polymer product having controlled stereoregularity, comprising the successive steps of: (i) producing a first polymerization product by contacting under polymerization conditions an $\alpha$-olefin with a polymerization catalyst system to give a first polymerization reaction mixture; and (ii) producing a second polymerization product by contacting an $\alpha$-olefin with said high activity polymerization catalyst system.

According to one embodiment of the invention, the first polymerization product is produced by contacting said $\alpha$-olefin monomer, preferably propene and another $\alpha$-olefin or, preferably ethene as comonomer. The preferred propene monomer and ethene comonomer improve the properties of some propene polymer grades. Then, usually more than or equal to 90% by weight of propene is used as the $\alpha$-olefin monomer and less than or equal to 10% by weight of ethene is used as the comonomer. It shoud be noted that the ethene as comonomer is used in considerably larger amounts than the ethene which according to the invention is able to regulate the XS of step (ii). Compare e.g. with EP 339 804.

In the field of Ziegler-Natta catalysis, the use of an organometal compound is fundamental. The compound is generally called a cocatalyst. The use of a stereoregulating electron donor is also common. It is generally called an external electron donor. The present invention is according to one embodiment based on the interaction between the external donor and two different organometal compounds. Thus, the type of the third catalyst component mentioned, namely the transition metal component, is not critical, as long as it is capable of high activity polymerization. See the initial discussion on the meaning and role of the components.

In the claimed process, a highly active and stereospecific catalyst systems is preferred. Advantageously, the high activity polymerization catalyst system is the reaction product of a supported intermediate containing magnesium, titanium, halogen and optionally an internal donor, with the first organometal compound and the stereoregulating external electron donor. Said reaction product is preferably obtained by contacting magnesium chloride or a complex thereof, titanium tetrachloride and an internal electron donor into a solid intermediate and contacting the solid intermediate with the first organometal compound and the stereoregulating external electron donor.

In order to act as support for the titanium tetrachloride and the internal electron donor in the solid intermediate, the magnesium chloride must be in a chemically active form. This means that the magnesium chloride must have lower crystallinity and higher specific surface area than conventional commercial magnesium chloride.

Magnesium chloride may be activated mechanically. In such a process, it is dry-comilled together with the internal electron donor. Then, the comilled product is heat-treated with an excess of titanium tetrachloride, followed by repeated washings with titanium tetrachloride and/or hydrocarbons to give the solid intermediate. Typically, such a solid intermediate exhibits a high specific surface area (50–300 $m^2/g$) and contain from 0.5 to 3% by weight of titanium.

Preferably, the magnesium chloride is activated chemically. This can be accomplished by contacting a complex of magnesium chloride, the titanium tetrachloride and the internal electron donor, whereby the complex is converted to activated magnesium chloride supporting the titanium tetrachloride and the internal electron donor.

According to one preferred embodiment of the invention, said complex of magnesium chloride is a solid adduct of magnesium chloride and an alcohol having the formula (4)

$$MgCl_2.nR''''OH \qquad (4)$$

wherein n is 1–6, preferably 2–4 and R'''' is a $C_1$–$C_{10}$ alkyl, preferably a $C_1$–$C_3$ alkyl. n is preferably 2–4. Most preferably, the solid adduct of magnesium chloride and an alcohol having the formula (4) is a complex of the formula $MgCl_2.3C_2H_5OH$.

The solid adduct of magnesium chloride and alcohol having the formula (4) is conveniently prepared by heating and melting the magnesium chloride and the alcohol together, dispersing or spraying the melt into small droplets and solidifying the droplets by contact with a cooled medium. The dispersion of the melt into small droplets may typically take place by pouring the melt into hot silicon oil under stirring, thereby forming a hot dispersion of molten droplets in silicon oil. Then, the solidification is brought about by pouring the hot dispersion into cold hydrocarbon.

Alternatively the melt of magnesium chloride and alcohol is sprayed by means of pressurized inert gas through a die into a space containing cold inert gas, whereby the small droplets are formed and solidified almost instantly. This process is also called spray crystallization.

Finally, said solid magnesium dichloride/alcohol adduct which has been obtained in powder form is contacted with the titanium tetrachloride and the internal electron donor. The titanium tetrachloride both removes the alcohol thereby exposing coordination sites on the magnesium chloride and coordinates to part of the formed coordination sites. The internal electron donor coordinates to another part of the coordination sites. There may be chemical reactions between the alcohol and the internal electron donor. Anyway, the result is a solid intermediate comprising magnesium chloride supporting the titanium tetrachloride and the internal electron donor or its reaction product.

The internal electron donor used for preparing the solid intermediate is any organic compound which contains an electron donating atom such as N, P, O and S, gives catalytic activity and enables stereospecific polymerization. The art of Ziegler-Natta catalysis knows a multitude of suitable electron donors for this purpose. Preferably, the internal electron donor is a $C_1$–$C_{14}$ alkyl ester of a carboxylic acid. Typical such esters are $C_1$–$C_{14}$ alkyl esters of aliphatic dicarboxylic acids such as maleic acid, malonic acid and cyclohexanedicarboxylic acid, $C_1$–$C_{14}$ alkyl esters of aromatic monocarboxylic acids such as substituted and unsubstituted benzoic acids, and $C_1$–$C_{14}$ alkyl esters of aromatic dicarboxylic acids, such as phthalic acid.

According to a preferred embodiment of the invention, the internal electron donor is a $C_4$–$C_{14}$ alkyl ester of an aromatic carboxylic acid. More preferably, the internal electron donor is a di-$C_4$–$C_{14}$ alkyl ester of a dicarboxylic acid. Most preferably, the internal electron donor is a di-$C_4$–$C_{14}$ alkyl ester of an aromatic dicarboxylic acid, such as a di-$C_4$–$C_{14}$ alkyl phthalate.

Preferably, the above mentioned solid intermediate is produced by contacting said solid adduct of magnesium dichloride and a $C_1$–$C_3$ alcohol as the magnesium chloride complex and a $C_4$–$C_{14}$ alkyl ester of a carboxylic acid as the internal electron donor, whereby said complex, said titanium tetrachloride and said ester most preferably are being contacted at an elevated temperature to produce said solid intermediate in the form of a transesterification product. Thereby, said adduct, said titanium tetrachloride and said ester are contacted at 110–200° C., preferably at 120–150° C. at which temperature the transesterification takes place.

When preparing the above mentioned solid intermediate, the used amounts of magnesium chloride or a complex thereof and titanium tetrachloride are such that in said catalyst system, the molar ratio Mg/Ti is preferably between about 1 and about 200, most preferably between about 5 and about 50. The used amount of said internal donor (ID) is preferably such that in said intermediate, the molar ratio ID/Ti is between about 0.1 and about 10, most preferably between about 0.3 and about 3.

When the solid intermediate is contacted with the first organometal compound and the stereoregulating external electron donor give said high activity polymerization catalyst system, the contacting can take place in one, two or more steps. According to one embodiment of the invention, said solid intermediate is preactivated first with one out of two portions containing the first organoaluminium compound, and then contacted with the other. In the preactivation the Al/Ti ratio is preferably between 0.1 and 10, more preferably between 1 and 5, most preferably between 2 and 3. Usually, the stereoregulating external donor and the first organoaluninium compound are contacted in the form of a $C_5$–$C_8$ hydrocarbon solution.

As is common with polymerization catalyst systems of this kind, the active catalyst system precursor can alternatively be coated with a small amount of polymer before using it in the actual polymerization. This is called prepolymerization. In a prepolymerization, said solid intermediate is typically contacted with the stereoregulating external donor and the first organoaluminium compound, as well as a small portion of an olefin (not necessary the same one as is used in the actual polymerization), under polymerization conditions, in order to obtain particles of said first high activity polymerization catalyst system which are coated with polyolefin. Such a prepolymerized catalyst system is easy to handle and has a desirable morphology.

In the high activity polymerization catalyst system used in the claimed process, the used amounts of the first organoaluminium compound expressed as aluminium $Al_1$ and said titanium tetrachloride of said solid intermediate, expressed as titanium Ti, are preferably such that the molar feed ratio $Al_1$/Ti leading to the high activity polymerization catalyst system is from about 1 to about 1000, more preferably from about 50 to about 500, most preferably from about 100 to about 300.

Correspondingly, the used amounts of the first organoaluminium compound expressed as aluminium $Al_1$ and the stereoregulating external electron donor D are preferably such that the atom to mol feed ratio $Al_1$/D leading to the first high activity polymerization catalyst system is from about 10 to about 200, most preferably from about 30 to about 100. The used amounts of the stereoregulating external electron donor D and said titanium tetrachloride expressed as titanium Ti are preferably such that the molar feed ratio D/Ti leading to the first high activity polymerization catalyst system is from about 1 to about 20, most preferably from about 2 to about 10.

The invention also covers embodiments outside the examples. Equipped with the basic information provided by this document, the parameters, reactants, etc. can be optimized to produce polyolefin having a restricted and/or controlled XS value. Thus, (i) the first polymerization product is preferably produced under conditions which give polypropene having an isotacticity, expressed as XS (xylene soluble fraction), selected from XS values lower than or equal to 8.0% by weight and higher than or equal to 1.5% by weight, more preferably XS values smaller than or equal to 5.0% by weight and larger than or equal to 2.0% by weight.

The steps or measures of the process can be carried out in any convenient apparatus, having one or more reactors. The process can be a batch or continuous process. Preferably, the process is carried out in two or more reactors comprising bulk reactors, e.g. loop reactors, preferably two or more loop reactors or one or more bulk reactors plus one or more gas phase reactors.

According to one embodiment of the invention, the first polymerization product is (i) produced in a bulk reactor, preferably in a loop reactor. Most preferably it is produced under polymerization conditions selected from:

temperature selected from temperatures which are higher than or equal to 40° C. and lower than or equal to 120° C., preferably temperatures which are higher than or equal to 60° C. and lower than or equal to 100° C., a pressure selected from pressures which are higher than or equal to 20 bar and lower than or equal to 80 bar, preferably pressures which are higher than or equal to 30 bar and lower than or equal to 60 bar, a hydrogen addition for controlling the molar mass in a manner known per se.

The process according to the invention comprises the production of a second polymerization product. See step (ii) above. The second polymerization product is preferably produced by contacting propene as said α-olefin monomer.

The second polymerization product is preferably produced in a gas phase reactor (GPR). Advantageously, the gas phase polymerization conditions are selected from:

a temperature selected from temperatures which are higher than or equal to 50° C. and lower than or equal to 130° C., preferably temperatures which are higher than or equal to 70° C. and lower than or equal to 100° C., a pressure selected from pressures which are higher than or equal to 10 bar and lower than or equal to 60 bar, preferably pressures which are higher than or equal to 20 bar and lower than or equal to 40 bar, a hydrogen addition for controlling the molar mass in a manner known per se.

The product of the claimed process is an integrated mixture of said first polymerization product and said second polymerization product. They are integrated by (ii) producing the second polymerization product in the presence of (i) the first polymerization product. By first polymerization product is e.g. meant the whole reaction mixture resulting from the first polymerization or just a part thereof including the produced polymer. Preferably, the second polymerization is carried out in the presence of both the first polymer and its catalyst system, i.e. said polymerization catalyst system.

Advantageously, said second organometal compound is added to the polymerization catalyst system before (ii) producing the second polymerization product, preferably between (i) producing the first polymerization product and (ii) producing the second polymerization product. This is easily accomplished e.g. by adding the second organometal compound to the second polymerization reactor or preferably to the pipeline connecting the first and the second polymerization reactors, such as the loop and gas phase reactors, respectively. The small amount of olefin, preferably ethene, can be added to the pipeline or to the second reactor. Preferably it is added separately to the second reactor.

Further, the process can be preferably carried out under polymerization conditions which produce (i) first polymerization product and (ii) second polymerization product in a mass ratio selected from ratios higher than or equal to 20:80 and lower than or equal to 70:30, preferably from ratios higher than or equal to 30:70 and lower than or equal to 60:40, most preferably from ratios higher than or equal to 35:65 and lower than or equal to 65:35.

Preferably, the process of the invention is carried out under conditions which give a propene polymer product having an isotacticity, expressed as XS (xylene soluble fraction), selected from XS values lower than or equal to 8% by weight, more preferably lower than or equal to 6% by weight, most preferably lower than or equal to 5% by weight. Preferably, the XS values are higher than or equal to 1.5% by weight, most preferably, higher than or equal to 2.0% by weight.

The following advantages were reached when a small amount of ethene or other stereoregularity controlling agent were used for isotacticity control:

The feed of a donor complexing agent like EADC gives very good hydrogen sensitivity for the catalyst.

A small ethene feed to step (ii) gives better activity for the catalyst.

The morphology of the polymer was clearly better when the donor complexing agent EADC and a small amount of ethene were present in step (ii).

The same donor (dicyclopentyldimethoxy silane) can be used for very high isotacticity moulding grades as well as for film and fiber grades. The transition time when switching the reaction system from grade to grade in commercial scale will be lower and the process will be more economical. In conventional systems one donor (cyclohexylmethyldimethoxy silane) is used for film and fiber grades and another donor (dicyclopentyldimethoxy silane) for moulding grades.

The control of isotacticity is very easy by ethene and/or EADC feed from the process's point of view. Constant donor feed can be used (Al/Ti=250 and Al/D=20) and the final control of the isotacticity is done by ethene feed and/or by using EADC or DEAC.

Lower XS values are required for film grades and then a small amount of ethene or a chlorinated organometal compound is used for balancing the isotacticities.

The application test shows that the best fiber grades are made by using the novel system.

EXAMPLES

Working Example 1

Catalyst

A highly active propylene polymerization catalyst of ZN type, prepared according to Finnish Patent No. 88047 was used. The catalyst was preactivated with a low amount of TEA (Al/Ti molar ratio=2.5) before use in polymerization. In catalyst preactivation dry catalyst was at first fed into oil, at 30° C. temperature. Oil/catalyst mixture was cooled down to 10° C. and TEA was mixed in (the titanium content of the catalyst was 2.0 wt-%). After mixing for 1 hour, temperature was increased and grease was added at 40° C. to keep the viscosity moderate. The mixture was cooled down to room temperature before use in polymerization. The catalyst consentration in oil-grease mixture was 10 g/dm$^3$.

Polymerization

Said mixture of catalyst and viscous medium was fed with non valve piston pump according to Finnish patent No. 94164. The catalyst was contacted with triethyl-aluminium (TEA) and dicyclopentyldimethoxy silane (donor D) in the pipeline. Al/Ti molar ratio was about 250 mol/mol and Al/D molar ratio was 20. The activation time between catalyst, cocatalyst and donor was 15 seconds before these chemicals were fed to polymerization.

The catalyst was flushed with propylene to the prepolymerization reactor (CCSTR=Compartmented Continuous Stirred Tank Reactor) in which also TEA and D-donor were fed. The CCSTR reactor has been disclosed in Finnish Patent Application No. 961152.

Prepolymerization was conducted at 30° C. and 50–54 barg pressure. The residence time of the particles was 8–10 minutes. Hydrogen feed to prepolymerization reactor was 0.1–0.2 mol-%. The prepolymerized catalyst component was used in a loop reactor and a gas phase reactor connected in series.

The operating temperature in the loop reactor was 80° C. and the pressure was 50–54 bar. The residence time in the loop reactor was 35 minutes.

The gas phase reactor was operated at 85° C. and 25–29 bar pressure. The production split between loop and gas phase reactor was about 60/40. The residence time in GPR was 0.7–1.3 h.

The MFR (ISO 1133 2.16 kg/230° C.) of this compact spinning fibre product was controlled to be about 18 in both reactors via hydrogen feed.

The isotacticity of loop product and isotacticity of gas phase product were balanced by feeding 0.5 mol-% ethene (calculated directly from propylene feed) to loop reactor and by feeding 0.4 mol-% ethene to the gas phase reactor.

The xylene soluble fraction (XS) was measured and calculated as follows:

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS\ \% = (100 \times m_1 \times v_0)/(m_0 \times v_1)$$

$m_0$=initial polymer amount (g)
$m_1$=weight of residue (g)
$v_0$=initial volume (ml)
$v_1$=volume of analyzed sample (ml)

The polymerization conditions are shown in Table 1. Product characteristics are shown in Table 2. Application tests are shown in Table 3.

Working Example 2

The procedure was the same as in Working Example 1 but EADC (Ethylaluminum dichloride) was used as a donor complexing agent for balancing the isotacticities of the product coming from loop and gas phase reactor. The EADC was fed to direct feed line between loop and gas phase reactor. The amount of EADC feed was 1 mol/mol external donor. The external donor amount was lower (Al/D=72 mol/mol) in this test than in Example 1.

Polymerization conditions are shown in Table 1. Product characteristics are shown in Table 2. Application tests are shown in Table 3.

Comparative Example 3

The procedure was the same as in Example 1 but neither any kind of donor complexing agent nor etylene were used for balancing isotacticities. Donor C (cyclohexylmethyldimethoxy silane) was used as an external donor. The external donor amount was lower (Al/D=68 mol/mol) in this test than in Example 1.

Polymerization conditions are shown in Table 1. Product characteristics are shown in Table 2. Application tests are shown in Table 3.

TABLE 1

| | Polymerization conditions | | |
|---|---|---|---|
| Operation conditions | Example 1 Working | Example 2 Working | Example 3 Comparative |
| Catalyst type (Ti = 2.0 wt %) | ZN | ZN | ZN |
| Donor type | D | D | C |
| Al/Ti (mol/mol) | 250 | 240 | 256 |

TABLE 1-continued

| | Polymerization conditions | | |
|---|---|---|---|
| Operation conditions | Example 1 Working | Example 2 Working | Example 3 Comparative |
| Al/D (mol/mol) | 20 | 72 | 68 |
| D/Ti (mol/mol) | 12.5 | 3.3 | 3.8 |
| *$H_2$ feed, loop (mol %) | 0.2 | 0.19 | 0.1 |
| $C_2$ feed, loop (mol %) | 0.5 | — | — |
| Temperature prepol. (° C.) | 30 | 30 | 30 |
| Temperature, loop (° C.) | 80 | 80 | 80 |
| Residence time, loop (h) | 0.6 | 0.6 | 0.6 |
| Slurry density, loop (kg/m³) | 440 | 432 | 436 |
| EADC feed (mol/mol donor) | — | 1 | — |
| 100 wt % EADC feed (g/t C"3) | — | 1.65 | — |
| Temperature GPR (° C.) | 85 | 85 | 85 |
| Pressure GPR (bar) | 28 | 28 | 29 |
| Residence time, GPR (h) | 0.8 | 1.2 | 0.8 |
| $C_3$ conc., GPR (mol %) | 76 | 60 | 76 |
| $C_2$ conc., GPR (mol %) | 0.4 | — | — |
| $H_2/C_3$ (mol/mol) | 0.16 | 0.15 | 0.02 |
| Bed level (%) | 60 | 85 | 51 |
| Production SPLIT loop/GPR (wt %/wt %) | 60/40 | 59/41 | 60/40 |

*calculated directly from propene feed

TABLE 2

| | Product characteristics | | | | | | |
|---|---|---|---|---|---|---|---|
| Examples | Split L/G | $MFR_2$ LOOP | $MFR_2$ Prod. | XS, % LOOP | XS, % Prod. | $C_2$, % LOOP | $C_2$, % Prod. |
| Example 1, working | 60/40 | 27 | 17 | 2.2 | 2.1 | 0.2 | 0.2 |
| Example 2, working | 59/41 | 16 | 18 | 3.4 | 3.6 | — | — |
| Example 3, comparative | 60/40 | 20 | 18 | 3.9 | 3.5 | — | — |

TABLE 3

Applications tests
Application tests were carried out by using Barmag Spinning
Conditions: 40 000 holes/0.25 mm.

| | Spinning | | Fiber (2.5 dtex) properties | | | | | |
|---|---|---|---|---|---|---|---|---|
| Material | Temp. ° C. | Speed m/min | Tenacity cN/dtex | V % | Elongation % | V % | MFR | Remarks |
| Example 1, working | 250 | 50 | 1.53 | 14.5 | 336 | 24 | 19 | Spinnability very good |
| | 260 | 60 | 1.56 | 9.3 | 352 | 17 | 21 | |
| | 270 | 65 | 1.48 | 10.8 | 332 | 26 | 20 | |
| | 280 | 60 | 1.60 | 3.7 | 396 | 14 | 20 | |
| Example 2, working | 250 | 65 | 1.37 | 11 | 301 | 26 | 21 | Spinnability good |
| | 260 | 65 | 1.25 | 12.5 | 245 | 29 | 23 | |
| | 270 | 65 | 1.45 | 14.2 | 267 | 28 | 23 | |
| | 280 | — | — | — | — | — | — | |
| Example 3, comparative | 250 | — | — | — | — | — | — | Spinnability very poor |
| | 260 | 45 | 1.45 | 15.8 | 295 | 27 | 24 | |
| | 270 | 45 | 1.60 | 16.8 | 365 | 27 | 21 | |
| | 280 | 55 | 1.45 | 12.7 | 283 | 32 | 22 | |

What is claimed is:

1. A process for the preparation of an α-olefin polymer having a controlled stereoregularity, comprising the successive steps of: (i) producing a first polymerization product by contacting an (α-olefin monomer with a polymerization catalyst system comprising a transition metal compound, a first organometal compound and a stereoregulating external electron donor to give a first polymerization reaction mixture; (ii) producing a second polymerization product by contacting an additional α-olefin monomer with the first polymerization reaction mixture, characterized in that in step (ii) the second polymerization product is produced in the presence of a stereoregulatory controlling agent selected from a second organometal compound and 0.01–1.2% of an olefin which is not said α-olefin monomer, calculated on the total amount of said olefin and said α-olefin monomer, and wherein said first organometal compound may optionally contain halogen and said second organometal compound contains halogen, and wherein said second organometal compound contains, on an atom basis, more halogen per metal than the first organometal compound.

2. A process according to claim 1, characterized in that the stereoregularity of the second polymerization product is regulated to essentially the same level as that of said first polymerization product.

3. A process according to claim 1, characterized in that said olefin which is not said α-olefin monomer, is ethene.

4. A process according to claim 1, characterized in that the first organometal compound is an organoaluminum compound.

5. A process according to any of claims 1–4, characterized in that said second organometal compound is a second organoaluminum compound.

6. A process according to claim 5, characterized in that said second organoaluninium compound which has the formula (2) is selected from ethylaluminium dichloride EADC and diethylaluminium chloride DEAC.

7. A process according to claim 1, characterized in that in step (ii) the second polymerization product is produced in the presence of 0.08–0.8% of said olefin, which is not said α-olefin monomer.

8. A process according to claim 1, characterized in that the stereo-regulating external donor is selected from hydrocarbyl hydrocarbyloxy silane compounds which have the formula (3);

$$R''_{n''}\text{-Si}(OR''')_{4-n''} \quad (3)$$

Wherein R" and R''' are, independently, a $C_1$–$C_{12}$ hydrocarbyl, and n" is an integer 1–3.

9. A process according to claim 5, characterized in that the used amounts of said second organoaluminum compound expressed as aluminum $Al_2$ and the stereoregulating external electron donor D are such that the atom is mol feed ratio $Al_2/D$ is from about 0.1 to about 10.

10. A process according to claim 1, characterized in that the polymerization products of steps (i) and (ii) are produced by contacting propene as the α-olefin monomer.

11. A process according to claim 1, characterized in that said first polymerization product is produced by contacting said α-olefin monomer and another α-olefin or ethene as comonomer.

12. A process according to claim 1, characterized in that the polymerization catalyst system is the reaction product of a compound containing magnesium, titanium, halogen and optionally an internal donor, with the first organometal compound and the stereoregulating external electron donor.

13. A process according to claim 12, characterized in that the high activity polymerization catalyst system has been prepared by contacting magnesium dichloride or a complex thereof, titanium tetrachloride and an internal electron donor into a solid intermediate and contacting the solid intermediate with the first organometal compound and the stereoregulating external electron donor.

14. A process according to any of claims 10–13, characterized in that (i) the first polymerization product is produced under conditions which give polypropene having XS values smaller than or equal to 8.0% by weight and larger than or equal to 1.5% by weight.

15. A process according to claim 1, characterized in that (i) the first polymerization product is produced in a bulk reactor.

16. A process according to claim 1, characterized in that (ii) the second polymerization product is produced in a gas phase reactor.

17. A process according to claim 1, characterized in that said second organometal compound is added to the high activity polymerization catalyst system before (ii) producing the second polymerization product.

18. A process according to claim 1, characterized in (i) the production of the first polymerization product and (ii) the production of the second polymerization product are carried out in successively connected polymerization reactors.

19. A process according to claim 18, characterized in that said 0.01–1.2% of ethene is added to the latter of the two successively connected polymerization reactors.

20. A process according to claim 1, characterized in that the produced polymer has a melt flow rate $MFR_2$ of 0.03–2000 g/10 min.

21. An α-olefin polymer prepared by a process according to claim 1.

22. A fiber, film or molding product made of the α-olefin polymer according to claim 21.

23. The process according to claim 4, wherein the first organometal compound is a compound having the formula (1)

$$R_{3m-n}Al_mX_n \quad (1)$$

wherein R is a $C_1$–$C_{12}$ alkyl, X is a halogen, m is 1 or 2 and n is an integer such that $0 \leq n < 3m-1$.

24. The process according to claim 23 wherein the compound is a tri-$C_1$–$C_{12}$ alkyl aluminum.

25. The process according to claim 24 wherein the compound is triethyl aluminum.

26. The process according to claim 5 wherein the organoaluminium compound has the formula (2)

$$R'_{3m'-n'}Al_{m'}X'_{n'} \quad (2)$$

wherein R' is a $C_1$–$C_{12}$ alkyl, X' is a halogen, m' is 1 or 2 and n' is such an integer that n'/m'>n/m, wherein n and m are the same as in formula (1), and n'<3m'.

27. The process according to claim 26 wherein the organoaluminium compound is a $C_1$–$C_4$ alkylaluminium dihalide, a di-$C_1C_4$ alkylaluminium halide or a $C_1$–$C_4$ alkylaluminium sesquihalide, as well as mixtures thereof.

28. The process according to claim 27 wherein the organoaluminium compound is ethylaluminium dichloride (EADC), diethylaluminium chloride (DEAC) and ethylaluminium sesquichloride (EASC), as well as mixtures thereof.

29. The process according to claim 7, wherein in step (ii) the second polymerization product is produced in the presence of 0.1–0.4% of said olefin, which is not said α-olefin monomer.

30. The process according to claim 8, wherein R" and R''' are, independently, a di-$C_4$–$C_{12}$ hydrocarbyl di-$C_1$–$C_3$ alkoxy silane or a $C_4$–$C_{12}$ hydrocarbyl $C_1$–$C_3$ hydrocarbyl $C_1$–$C_3$ alkoxy silane.

31. The process according to claim 30, wherein R" and R'" are, independently, dicyclopentyldimethoxy silane or cyclohexymethyldimethoxy silane.

32. The process according to claim 9, wherein the mol feed ratio $Al_2/D$ is from about 0.5 to about 1.5.

33. The process according to claim 32, wherein the mol feed ratio $Al_2/D$ is from about 0.6 to about 1.4.

34. The process according to claim 14, wherein the XS values are smaller than or equal to 5.0% by weight and larger than or equal to 2.0% by weight.

35. The process according to claim 15, characterized in that (i) the first polymerization product is produced in a loop reactor.

36. The process according to claim 17, wherein the second organometal compound is added to the high activity polymerization catalyst system between (i) producing the first polymerization product and (ii) producing the second polymerization product.

37. The fiber product of claim 22.

* * * * *